3,253,903
HERBICIDAL COMPOSITION AND METHOD
David X. Klein, Upper Montclair, and Theodore A. Girard, Wayne Township, Passaic County, N.J., assignors, by mesne assignments, to Tenneco Chemicals, Inc., a corporation of Delaware
No Drawing. Filed Jan. 9, 1962, Ser. No. 165,233
3 Claims. (Cl. 71—2.6)

The present invention relates to herbicides and their use and is particularly concerned with novel mixtures of herbicides and the use of such mixtures to obtain unexpected results.

This is a continuation-in-part of our copending application, Serial No. 583,899, which was filed on May 10, 1956, now abandoned.

Herbicides are used extensively for inhibiting undesirable plant growth with the use of any particular herbicide depending upon its characteristics. While many herbicides destroy or inhibit a variety of species of plant growth, most herbicides, and particularly those which have received wide acceptance for commercial use, are selective, that is, more effective against some species of plant growth than others. While a mixture of two or more selective herbicides has been applied to the same area to inhibit the growth of a plurality of species of plants, the total effect of such a mixture of herbicides is in most instances the sum of the effects of the individual herbicides. For example, a mixture of a herbicide effective against one species and a second herbicide effective against another species of plant growth can be applied to an area to inhibit the growth of both species. Generally the results are additive, and there are no unexpected results when such a mixture is used.

It has been discovered that the use of mixtures of herbicides, namely, mixtures of 2,3,6-trichlorobenzoic acid and one of certain groups of herbicides, produces unexpected, novel herbicidal effects in inhibiting the growth of a large variety of plant species. The mixed herbicides mutually enhance the effect of each other in some unexplained manner, and such mixtures are more effective economically, show an earlier onslaught, and are more persistent in effect. More particularly the novel mixtures of the present invention which produce an unexpected and advantageous herbicidal effect comprise (1) an effective amount of 2,3,6-trichlorobenzoic acid or its herbicidal salts and (2) an effective amount of at least one other herbicide selected from the group consisting of 3-p-chlorophenyl-1,1-dimethyl urea, 3-phenyl-1,1-dimethyl urea, 3-(3,4-dichlorophenyl)-1,1-dimethyl urea, 3-amino-1,2,4-triazole, α-chloro-N,N-diallylacetamide, α-chloro-N,N-diethylacetamide, 2,2-dichloropropionic acid and its herbicidal salts, esters, and amides, trichloroacetic acid and its herbicidal salts, esters and amides, and 2,4-dichlorophenoxyacetic acid and its herbicidal salts, esters and amides.

2,3,6-trichlorobenzoic acid is a highly effective herbicide for many species of plants and is by far the most herbicidally active isomer of trichlorobenzoic acid. The metal or amine salts of 2,3,6-trichlorobenzoic acid may be used in place of the acid with equal effect; the general remarks herein relating to 2,3,6-trichlorobenzoic acid are equally applicable to the salts of this acid. The herbicidal salts of 2,3,6-trichlorobenzoic acid include the salts of sodium, potassium, lithium, calcium, barium, magnesium, aluminum, iron, zinc, manganese, ammonia, t-butylamine, t-octylamine, 2-ethylhexylamine, di(2-ethylhexyl)amine, triethanolamine, aniline and methyl aniline.

The 2,3,6-trichlorobenzoic acid and its salts may be prepared in any suitable manner. When preparing this acid on a large scale, the product obtained usually is a mixture of isomers of trichlorobenzoic acid. Mixtures of trichlorobenzoic acid isomers as well as the salts of such mixtures have been tested on a weight for weight basis with other herbicides, and a mixture of isomers containing as little as about 60% of 2,3,6-trichlorobenzoic acid has been found to be about as effective as pure 2,3,6-trichlorobenzoic acid despite the fact that the other isomers are relatively ineffective when used alone. Isomer mixtures containing only 50% of the 2,3,6-isomer are also quite effective. This unexplained property of these mixed isomers is to be taken into consideration when using 2,3,6-trichlorobenzoic acid. However, for the sake of brevity and unless stated differently, general statements herein as to dosages for 2,3,6-trichlorobenzoic acid shall be based on the amount of this isomer regardless of whether or not other isomers are present. Mixed isomers of trichlorobenzoic acid containing less than 50% of 2,3,6-trichlorobenzoic acid may be used although such mixtures are not preferred.

The second herbicide present in the novel mixture is one or more herbicides selected from the group consisting of 3-p-chlorophenyl-1,1-dimethyl urea, 2,2-dichloropropionic acid, trichloroacetic acid, 2,4-dichlorophenoxyacetic acid, 3-amino-1,2,4-triazole, α-chloro-N,N-diallylacetamide, α-chloro-N,N-diethylacetamide, and their equivalents. These herbicides are well known as are their herbicidal equivalents. The salts, esters and amides of 2,2-dichloropropionic acid, trichloroacetic acid, and 2,4-dichlorophenoxyacetic acid may be used in place of these acids. It is to be understood that the general comments as to the efficacy of 2,2-dichloropropionic acid, trichloroacetic acid, and 2,4-dichlorophenoxyacetic acid also are applicable to the salts, esters and amides of these acids. Recognized equivalents of 3-p-chlorophenyl-1,1-dimethyl urea are 3-phenyl-1,1-dimethyl urea and 1-(3,4-dichlorophenyl)-1,1-dimethyl urea. These substituted urea compounds have the structural formula

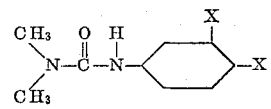

where X represents H or Cl.

In utilizing the present herbicidal mixtures to obtain the unexpected and advantageous results, the relative proportions of the herbicides may vary widely. When the mixture is applied to a locus in which plant growth is to be controlled, an effective amount of each herbicide must be applied and preferably the herbicidal mixture is so proportioned that when applied the quantity of neither herbicide is substantially in excess of that required for the purposes intended. The relative proportions of the herbicides will vary depending upon the particular species of plants to be controlled, the nature of the soil, the amount of rainfall, and other factors which influence the effect of herbicides. In general, the proportion of one herbicide to the other herbicide will be in the range such that there is at least one part by weight of one of the herbicides for each 25 parts by weight of the second herbicide, with the preferred ratio depending to a certain extent on the particular mixture being used. In general, when the second herbicide is 3-amino-1,2,4-triazole, then about 1–3 pounds of this compound is used per each 1–25 pounds of 2,3,6-trichlorobenzoic acid with the preferred ratio of this triazole to this acid being 1:5. The triazole will readily react with the 2,3,6-trichlorobenzoic acid to form an amine salt of this acid, and this herbicidal salt may be used. When 2,3,6-trichlorobenzoic acid is used with a herbicide other than 3-amino-1,2,4-triazole, the proportion of one herbicide to the other is preferably in the range of 1:10. When a herbicidal salt, ester, or amide of one of the herbicidal acids is being used, the quantity of herbicidal salt, ester, or amide used in the mixture or applied to the locus is the quantity equivalent to the desired amount of herbicidal acid. In other words, when it is desirable to use 10 pounds of 2,3,6-trichlorobenzoic acid, either 10 pounds of such acid may be used or the amount of a salt of 2,3,6-trichlorobenzoic acid may be used that is produced by reaction of 10 pounds of the acid with the stoichiometric amount of salt former. The amount of salt that is used may be determined by means of the following equation:

$$\frac{\text{Mol. wt. of herbicidal acid}}{\text{Mol. wt. of salt}} = \frac{\text{Dosage wt. of herbicide}}{\text{Wt. of salt applied}}$$

The present herbicides may be used in any suitable manner and may be applied in the form of solutions, dusts, dispersible powders, or aqueous dispersions or emulsions. The herbicidal mixtures may be applied by dusting or spraying. In the preparation of sprays, the herbicides may be dissolved or dispersed in a liquid carrier, such as in water or other suitable solvent, and the resulting concentrated mixture may, if desired, be diluted or dispersed in water prior to application.

The herbicides, usually diluted with a herbicidal carrier, may be applied to an area to destroy existing plant growth, to prevent subsequent growth, or both. The dosage, that is, the amount of each herbicide applied per unit of area, depends upon the species of plants to be controlled and the period in which it is desired to prevent new growth. While in general the herbicidal mixture is applied in such a manner as to deposit it uniformly over the area treated and at the desired dosage or weight of herbicide per unit of area, the mixture may be applied, for example, to existing growth until the growth is wet to the run-off point. In the latter event, the dosage will vary per unit of area depending upon the amount of plant growth therein.

Example 1

In this test various herbicides were applied individually to a series of plots in a pasture meadow. The plots were separated from each other by untreated areas which also served as control areas. This pasture meadow contained established grasses (monocots) as well as broad leafed plants (dicots) including a considerable amount of plantain. The results obtained were observed at the end of an 11 week period and a 38 week period after application of the herbicides. The values 0 to 10 in the following table indicate increasing effectiveness. The value "0" indicates that there was no control, and the value "10" indicates there was substantially complete control. These values were obtained by comparison with the untreated areas. The dosages used were 6.25 pounds per acre, 12.5 pounds per acre, 25 pounds per acre, and 50 pounds per acre.

DICOTS

| Herbi-cide | 6.25 lb./Acre | | 12.5 lb./Acre | | 25 lb./Acre | | 50 lb./Acre | |
|---|---|---|---|---|---|---|---|---|
| | 11 wks. | 38 wks. | 11 wks. | 38 wks. | 11 wks. | 38 wks. | 11 wks. | 38 wks. |
| A | 5 | 10 | 9 | 10 | 9 | 10 | 10 | 10 |
| B | 2 | 10 | 8 | 10 | 10 | 10 | 10 | 10 |
| C | 3 | 10 | 8 | 10 | 9 | 10 | 9 | 10 |
| D | (¹) | 0 | (¹) | 2 | (¹) | 5 | (¹) | 7 |

MONOCOTS

| | 11 wks. | 38 wks. | 11 wks. | 38 wks. | 11 wks. | 38 wks. | 11 wks. | 38 wks. |
|---|---|---|---|---|---|---|---|---|
| A | 1 | 0 | 2 | 0 | 2 | 0 | 4 | 5 |
| B | 0 | 0 | 0 | 0 | 2 | 0 | 3 | 3 |
| C | 1 | 0 | 0 | 0 | 3 | 0 | 5 | 5 |
| D | 10 | 8 | 10 | 10 | 10 | 10 | 10 | 10 |

¹ The surviving broad leafed plants at the end of 11 weeks were plantain and the new plants at the end of 38 weeks were mostly plantain.
Herbicide A = Aqueous solution of the sodium salt of mixed isomers of trichlorobenzoic acid.
Herbicide B = Kerosene solution of mixed isomers of trichlorobenzoic acid.
Herbicide C = Solution of mixed isomers of trichlorobenzoic acid diluted with water.
Herbicide D = 3-p-chlorophenyl-1,1-dimethyl urea applied as a wettable powder dispersed in water.

In each instance the mixed isomers of trichlorobenzoic acid contained about 70% by weight of the 2,3,6-isomer and 30% of other isomers.

Example 2

This series of comparative tests was carried out by spray application of various herbicides in admixture and separately to plots in a pasture meadow. The herbicides used were 3-p-chlorophenyl-1,1-dimethyl urea, the sodium salt of 2,2-dichloropropionic acid, the sodium salt of trichloroacetic acid, and the sodium salt of mixed isomers of trichlorobenzoic acid containing about 70% by weight of 2,3,6-trichlorobenzoic acid with the remainder being other isomers. The amounts, dosages, for the various sodium salts are expressed in equivalent amounts of 2,2-dichloropropionic acid, trichloroacetic acid and trichlorobenzoic acid, respectively. Where more than one herbicide was applied, the herbicides were mixed in the proportions necessary to apply the amounts of both herbicides as indicated. Observations were made 25 days and 96 days after application. The values 0 to 10 are used to indicate increasing effectiveness.

| Herbicides lbs. per Acre | | | | 25 Days | | 96 Days | | |
|---|---|---|---|---|---|---|---|---|
| A | B | C | D | Monocots | Dicots | Monocots | Dicots | |
| | | | | | | | | New |
| 5 | | | 10 | 4 | 7 | 9 | 9 | Few. |
| 10 | | | 10 | 7 | 9 | 9 | 9 | None. |
| 20 | | | 20 | 9 | 10 | 10 | 10 | None. |
| 25 | | | | 8 | 7 | 10 | 7 | Few. |
| 50 | | | | 9 | 9 | 10 | 9 | None. |
| | 10 | | 10 | 5 | 5 | 10 | 7 | Many. |
| | 20 | | 20 | 9 | 7 | 10 | 9 | Many. |
| | 20 | | | 9 | 5 | 5 | 2 | Many. |
| | 40 | | | 9 | 5 | 9 | 3 | Many. |
| | | 10 | 10 | 2 | 2 | 4 | 7 | Many. |
| | | 20 | 20 | 3 | 7 | 4 | 10 | Few. |
| | | 20 | | 2 | 1 | 2 | 0 | Many. |
| | | 40 | | 5 | 3 | 8 | 0 | Many. |

In the above table:
A represents 3-p-chlorophenyl-1,1-dimethyl urea.
B represents the sodium salt of 2,2-dichloropropionic acid.
C represents the sodium salt of trichloroacetic acid.
D represents the sodium salt of mixed isomers of trichlorobenzoic acid containing about 70% of the 2,3,6-isomer.
New represents new seedlings of broad-leafed plants, mostly plantain.

Example 3

Three plots of pasture meadow were sprayed with different herbicidal compositions. The composition applied to one plot contained 2 parts of trichlorobenzoic acid per part of 3-p-chlorophenyl-1,1-dimethyl urea, while the composition applied to the second plot contained 2 parts of 3-p-chlorophenyl-1,1-dimethyl urea per part of trichlorobenzoic acid. In each instance the trichlorobenzoic acid was a mixture of isomers containing about 70% 2,3,6-trichlorobenzoic acid. The composition applied to the third plot contained only 3-p-chlorophenyl-1,1-dimethyl urea. The quantities of the compositions applied were such as to apply the hereinafter indicated amounts of herbicides per acre. The results are set forth as observed 20 days after application of the herbicides with the numbers 0 to 10 indicating increasing effectiveness.

| Plot No. | lbs./Acre | | Grasses | Plantain | New Seedlings |
|---|---|---|---|---|---|
| | A | B | | | |
| 1 | 5 | 10 | 10 | 10 | Few. |
| 2 | 10 | 5 | 7 | 10 | Few. |
| 3 | 15 | 0 | 10 | 10 | Few. |

A represents 3-p-chlorophenyl-1,1-dimethyl urea.
B represents the mixed isomers of trichlorobenzoic acid.

Example 4

This series of tests was carried out in a field which was planted with corn after cultivation so that the field was substantially free of weeds at the time of planting. Promptly after the corn was planted, different areas were sprayed at differing dosages with trichlorobenzoic acid, the butoxyethanol ester of 2,4-dichlorophenoxyacetic acid, and mixtures of these two herbicides. The ester was applied in an amount equivalent to the dosage amount of 2,4-dichlorophenoxyacetic acid. The trichlorobenzoic acid was a mixture of isomers containing about 70% by weight of 2,3,6-trichlorobenzoic acid with the remainder being other isomers of this acid. The dosage amount of these mixed isomers was the total amount of trichlorobenzoic acid. The results are set forth in the following table under each dosage as observed for 34 days and 80 days after application. The results are indicated by the values 0 to 10 to indicate increasing effectiveness in controlling weed growth as determined by comparison with nontreated areas.

In general, the maximum effect of the 2,4-dichlorophenoxyacetic acid compound took effect quickly and while the effect in the weeds could be observed 80 days after application, there was no appreciable build-up in effect. After the early onslaught this herbicide lost further effectiveness on new weed growth. The effect of the mixed herbicides became more noticeable as time passed, and the mixture was more persistent and effective over a longer period of time than was the 2,4-dichlorophenoxyacetic acid compound.

The present combinations of herbicides which include 2,3,6-trichlorobenzoic acid and one of the second herbicides are more effective and give control of a wider variety of plant species than similar and even larger quantities of either herbicide alone. In addition the herbicide mixtures tend to take effect more quickly for a wider range of species than do the individual herbicides. The addition of 2,3,6-trichlorobenzoic acid increases the effectiveness or persistency over a longer period. While the reasons for this are not fully understood, the presence of the 2,3,6-trichlorobenzoic acid apparently increases the persistency or effective life of the second herbicide. For example, a combined dosage of 20 pounds per acre of 2,3,6-trichlorobenzoic acid and 20 pounds per acre of 2,2-dichloropropionic acid is more effective after 96 days against both monocots and dicots than 40 pounds per acre of 2,2-dichloropropionic acid.

We claim:
1. A composition which comprises a mixture of a salt of 2,3,6-trichlorobenzoic acid and a salt of 2,4-dichlorophenoxyacetic acid in a weight ratio of one part of the former to form 0.25 to 20 parts of the latter.

2. A herbicidal composition which comprises 2,3,6-trichlorobenzoic acid and 2,4-dichlorophenoxyacetic acid in a weight ratio of one part of the former to from 0.25 part to 20 parts of the latter.

3. The method of inhibiting the growth of plants in a locus which comprises applying to the locus a herbicidal composition comprising a mixture of (a) a herbicidally effective amount of a material selected from the group consisting a 2,3,6-trichlorobenzoic acid and its salts and (b) a herbicidally effective amount of a 2,4-dichlorophenoxyacetic acid compound, said mixture containing 0.1 part to 10 parts by weight of (a) per part by weight of (b).

DOSAGE IN POUNDS PER ACRE

| Herbicide | 0.25 | | 0.5 | | 0.75 | | 1.0 | | 1.5 | |
|---|---|---|---|---|---|---|---|---|---|---|
| | 34 | 80 | 34 | 80 | 34 | 80 | 34 | 80 | 34 | 80 |
| A | 1 | 3 | 3 | 7 | 3 | 8 | 4 | 9 | 5 | 9 |
| B | 0 | 0 | 3 | 3 | 3 | 6 | 3 | 7 | 4 | 7 |
| C | 0 | 0 | .2 | 1 | 3 | 3 | 3 | 3 | 3 | 1 |

A represents the mixed isomers of trichlorobenzoic acid.
B represents a 50—50 mixture (acid equivalent) of herbicides A and C.
C represents the butoxyethanol ester of 2-4-dichlorophenoxyacetic acid.

References Cited by the Examiner
UNITED STATES PATENTS

| | | | |
|---|---|---|---|
| 2,709,648 | 5/1955 | Ryker et al. | 71—2.6 |
| 2,848,470 | 8/1958 | Girard | 71—2.6 |
| 3,014,965 | 12/1961 | Newcomer et al. | 71—2.6 X |
| 3,081,162 | 3/1963 | Tischler | 71—2.6 |
| 3,125,431 | 3/1964 | Kittila | 71—2.6 |

LEWIS GOTTS, *Primary Examiner.*

MAURICE A. BRINDISI, JULIUS S. LEVITT,
*Examiners.*

E. J. MEROS, JAMES O. THOMAS Jr.,
*Assistant Examiners.*